May 26, 1953      C. J. GALE      2,639,430
GLARE SHIELD FOR SPECTACLES
Filed Jan. 17, 1952
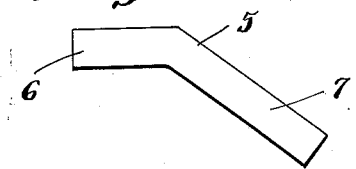
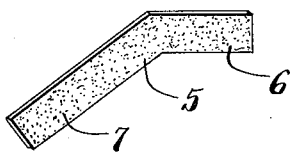
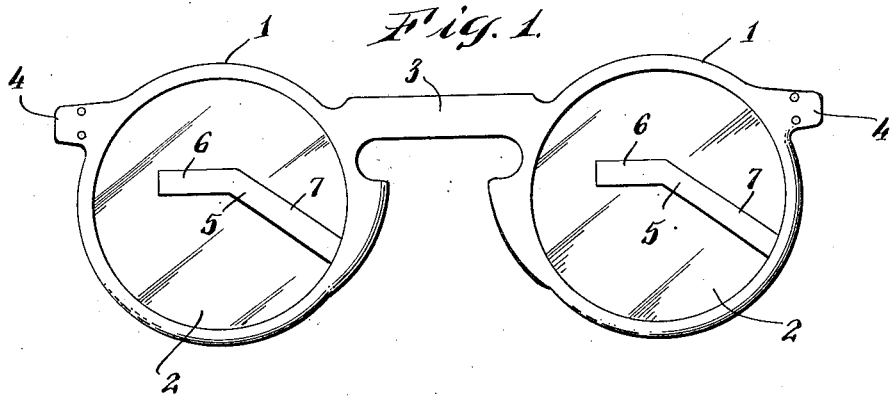
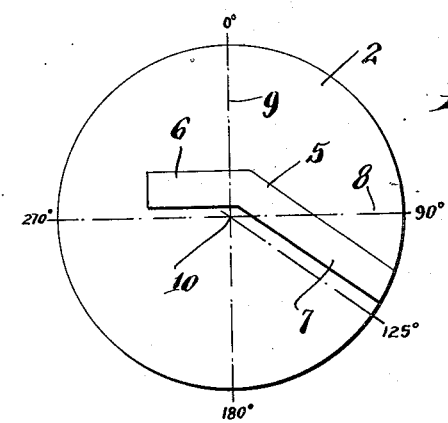
INVENTOR.
Charles J. Gale
BY
ATTORNEY.

Patented May 26, 1953

2,639,430

UNITED STATES PATENT OFFICE 2,639,430

GLARE SHIELD FOR SPECTACLES

Charles J. Gale, New York, N. Y.

Application January 17, 1952, Serial No. 266,959

2 Claims. (Cl. 2—14)

This invention relates to a glare shield and it is one object of the invention to provide a glare shield, wherein strips of opaque or semi-opaque material are mounted against the lenses of eyeglasses, such as spectacles, and serve very effectively to prevent a person from being blinded by glaring headlights of an approaching motor vehicle.

At the present time, anti-glare glasses are in use but they have lenses formed entirely of dark glass, or similar material, and have been found unsatisfactory as they interfere with a clear view of the road and make it difficult for a driver of a motor vehicle to see the road clearly and drive safely.

Therefore, another object of the invention is to provide anti-glare glasses wherein the lenses are formed of clear transparent material and have applied to them strips of glare repelling material so shaped and so applied to the lenses that they will protect a person's eyes from glare while allowing the person wearing them to have a clear view of the road ahead.

Another object of the invention is to provide the glasses with glare-repelling strips each having a portion extending horizontally and slightly above the center of the lens to which it is applied, the remainder of the strip extending at a downward incline towards the left side of the lens and serving very effectively to shield a person's eyes.

Another object of the invention is to provide lenses wherein the glare-repelling strips may be brought into position for shielding a person's eyes by raising or lowering the head slightly or by moving the head towards the right or left and thus keep the strips in a shielding position until the oncoming automobile has been passed.

Another object of the invention is to provide glare-repelling eyeglasses which are very efficient, simple in construction, and capable of being manufactured at low cost.

The invention is illustrated in the accompanying drawing, wherein:

Figure 1 is a view looking at the front of the improved glare-repelling eyeglasses;

Figure 2 is a view looking at the front or outer surface of one of the strips applied to the lenses of the eyeglasses;

Figure 3 is a view looking at the rear surface of the strip shown in Figure 2;

Figure 4 is an edge view of the glare-repelling strip; and

Figure 5 is a diagrammatic view illustrating the proper position of a glare-repelling strip applied to a lens.

The eyeglasses to which the glare-repelling strips are applied are of a conventional construction and have the usual frames 1 in which transparent lenses 2 are mounted. The frame 1 is connected by a bridge or nose piece 3 and from outer side portions of the frame project ears 4 with which rearwardly extending ear-engaging bows (not shown) are hingedly connected. The lenses may be formed of plain glass, or other suitable transparent material, or they may be optically ground lenses which allow the glare-repelling glasses to be worn when driving an automobile instead of wearing the glare-repelling glasses in addition to regular glasses.

The glare-repelling strips 5 may be formed of thin sheet material which is opaque or semi-opaque and each has a horizontally extending upper portion 6 and a portion 7 which is longer than the portion 6 and disposed diagonally at a downward incline towards the right side of the lens and terminates at or close to the marginal edge of the lens. The strip is preferably about one-fourth of an inch wide and its length in the proportion to its width shown in the drawing. The rear surface of the strip is gummed, as shown in Figure 3, so that it will adhere to the surface of the lens when applied thereto. When the strips are applied to the lenses, they are disposed, as shown diagrammatically in Figure 5. Referring to this figure, it will be seen that the horizontal upper portion 6 is disposed above the line 8 which passes through the center of the lens in parallel relation thereto and has one end spaced from the right side of the lens and its other end portion extending across the vertical line 9 a short distance.

The diagonal portion 7 extends downwardly from the upper portion at approximately an angle of 125 degrees or less. Since the horizontal upper portion is spaced upwardly from the center of the lens, indicated by the point 10 at which the lines 8 and 9 cross and the portion 7, is quite a distance to the left of a vertical line 9, a person wearing the glasses has a clear and unobstructed view forwardly and towards the right and left. When another motor vehicle is approaching with the headlights turned on the person wearing the glasses, he may move his head up or down or towards one side until the glare-repelling strip is in position to shield his eyes from blinding glare of the approaching vehicle and there will be no danger of an accident due to inability to see.

From the foregoing description of the construction of my improved glare shield spectacles, the assembly and operation thereof will be readily understood, and it will be seen that I have provided a simple, inexpensive and efficient means for carrying out the various objects of the invention.

While I have particularly described the elements best adapted to perform the functions set forth, it is apparent that various changes in form, proportion and in the minor details of construction may be restored to, without departing from the spirit or sacrificing any of the principles of the invention.

Having thus described my invention, what is claimed is:

1. Anti-glare eyeglasses comprising a pair of circular frames spaced transversely from each other, a nose piece between said frames, lenses mounted in said frames, said lenses being circular and formed of transparent material, and a glare-repelling strip mounted against each lens, said strips each having an end portion extending horizontally in a plane above and parallel to the horizontal diameter of the lens to which it is applied from a point in spaced relation to a marginal edge portion of the said lens to a point slightly beyond the center of the lens, the remaining portions of the said strip extending diagonally from the horizontal portion at a downward incline towards the left hand side portion of the lens and terminating at the periphery of the lens in upwardly spaced relation to the lower ends of the vertical diameter of the lens.

2. Anti-glare eyeglasses comprising a pair of lenses, a nose piece between said lenses, said lenses being formed of transparent material and each having a vertical diameter and a horizontal diameter intersecting at the center of the lens, and a glare-repelling strip upon a surface of each lens, each strip extending horizontally for a portion of its length in a plane above the horizontal diameter of the lens with which it is associated, the said strip for the remainder of its length extending diagonally at a downward incline from an end of the horizontal portion across the horizontal diameter of the lens to the marginal edge of the lens and located in upwardly spaced parallel relation to a radius of the lens located midway the horizontal diameter and the vertical diameter of the lens.

CHARLES J. GALE.

References Cited in the file of this patent

UNITED STATES PATENTS

| Number | Name | Date |
|---|---|---|
| 1,095,543 | Barr | May 5, 1914 |
| 2,511,329 | Craig | June 13, 1950 |

FOREIGN PATENTS

| Number | Country | Date |
|---|---|---|
| 314,747 | Great Britain | July 4, 1929 |
| 637,502 | France | Jan. 30, 1928 |